United States Patent
Bonissone et al.

Patent Number: 6,141,648
Date of Patent: *Oct. 31, 2000

[54] METHOD FOR ESTIMATING THE PRICE PER SQUARE FOOT VALUE OF REAL PROPERTY

[75] Inventors: Piero Patrone Bonissone, Schenectady; William Estel Cheetham, Clifton Park, both of N.Y.

[73] Assignee: General Electric Company, Schenectady, N.Y.

[*] Notice: This patent is subject to a terminal disclaimer.

[21] Appl. No.: 09/118,188

[22] Filed: Jul. 17, 1998

Related U.S. Application Data

[63] Continuation-in-part of application No. 08/519,479, Aug. 25, 1995, abandoned.

[51] Int. Cl.$^7$ ..................................................... G06F 15/18
[52] U.S. Cl. .............................................................. 705/10
[58] Field of Search ................................ 705/10, 30, 35, 705/36, 37, 38, 26, 27; 707/10, 100, 200

[56] References Cited

U.S. PATENT DOCUMENTS

| | | | |
|---|---|---|---|
| 5,361,201 | 11/1994 | Jost et al. | 364/401 |
| 5,414,621 | 5/1995 | Hough | 705/10 |
| 5,680,305 | 10/1997 | Apgar, IV | 705/10 |
| 5,960,407 | 9/1999 | Vivona | 705/10 |

OTHER PUBLICATIONS

Americal Institute of Real Estate Appraisers, Appraising Residential Property, pp. 371–436 2ed., Jul. 1994.

Avelino J. Gonsales, "A Case–Based Reasoning Approach to Real Estate Property Appraisal", Expert Systems with Applications, v4 pp. 229–246, Year 1992.

"A Case–Based Reasoning Approach to Real Estate Property Appraisal" by A Gonzalez, et al., pp. 229–246.

"The Sales Comparison Approach" Apraising Residential Properties (2nd Edition, 1994) pp. 371–436.

US Patent Application, RD–24,354 "A Method for Validating Specified Prices on Real Property" by William E. Cheetam and Piero P. Bonissone.

US Patent Application, RD–24,351 "A Method for Estimating the Value of Real Property" by William E. Cheetam. & Piero P. Bonissone.

American Institute of Real Estate Appraisers, Appraising Residential Properties, 371–436 (2d ed.) Jul. 1994.

Avelino J. Gonzales, "A Case–Based Reasoning Approach to Real Estate Property Appraisal", Expert Systems with Applications, v 4, pp. 229–246, 1992.

*Primary Examiner*—Frantzy Poinvil
*Attorney, Agent, or Firm*—David C. Goldman; Jill M. Breedlove

[57] ABSTRACT

A computer-implemented method for estimating a dollar per square foot value of a subject property. A set of properties comparable to the subject property are retrieved. The comparable properties are characterized by a plurality of common attributes each having a respective value. The plurality of common attributes include distance from the subject property, sale price, and living area. The distance of the comparable properties to the subject property are rated on a fuzzy preference scale indicating desirable and tolerable deviations from an ideal match with the subject property. Each evaluation generates a weighted preference. The sale price and the living area from each of the comparable properties are then aggregated with the weighted preference for that comparable into a dollar per square foot estimate of the subject property.

2 Claims, 2 Drawing Sheets

METHOD FOR ESTIMATING THE PRICE PER SQUARE FOOT VALUE OF REAL PROPERTY

This is a continuation-in-part of application Ser. No. 08/519,479 filed Aug. 25, 1995, now abandoned.

CROSS-REFERENCES TO RELATED APPLICATIONS

This application is related in subject matter to application Ser. No. 09/118,103 filed Jul. 17, 1998, and application Ser. No. 09/118,112 filed Jul. 17, 1998.

FIELD OF THE INVENTION

This invention relates generally to real estate appraisals and more particularly to a method for estimating the dollar per square foot value of real property.

Real estate appraisals are used to estimate the defined value of a real property interest in real estate. The appraisals have use in many types of real estate transactions. For example, a buyer may use an appraisal to find out a property's market value before accepting a selling price, a seller may use an appraisal to determine a selling price, an insurer may use an appraisal before underwriting a mortgage loan, or a lender may use an appraisal to acquire certain information about a property before issuing a loan for that property. A problem with appraisals is that they can take a lot of time (i.e. about four days) to complete, which may be too long in many of today's real estate transactions. The appraisal takes about four days because the appraiser needs to inspect the subject property, find recent sales that are comparable to the subject property, determine the comparables which are the most relevant to the subject property, adjust the sales prices of the most relevant comparables to reflect their differences from the subject property, reconcile the adjusted sales prices to derive a single value estimate of the subject property. In many cases a full appraisal is not needed. For example, an easier way to appraise real property is to determine the dollars per square foot that would be typical for the real property. In this approach, a dollar value estimate for the real property is determined by taking the dollars per square foot value for the real property and multiplying it by the living area of the property. However, there are presently no easy approaches that determine the dollars per square foot value of real property based on a set of comparable properties.

SUMMARY OF THE INVENTION

Thus, in accordance with this invention, there is provided a computer-implemented method for estimating a dollar per square foot value of a subject property according to a set of comparable properties. In this invention, the set of properties comparable to the subject property are retrieved from a case base. The comparable properties are characterized by a plurality of common attributes each having a respective value. The plurality of common attributes comprise distance from the subject property and living area measured in dollars per square foot. The distance attribute values from the set of comparable properties are evaluated to the subject property on a fuzzy preference scale indicating desirable and tolerable deviations from an ideal match with the subject property. Each evaluation generates a weighted preference having a value between 0 and 1. Next, the living area attribute from each of the comparable properties are then aggregated with the weighted preference into a dollar per square foot estimate of the subject property.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE INVENTION

Figure 1:
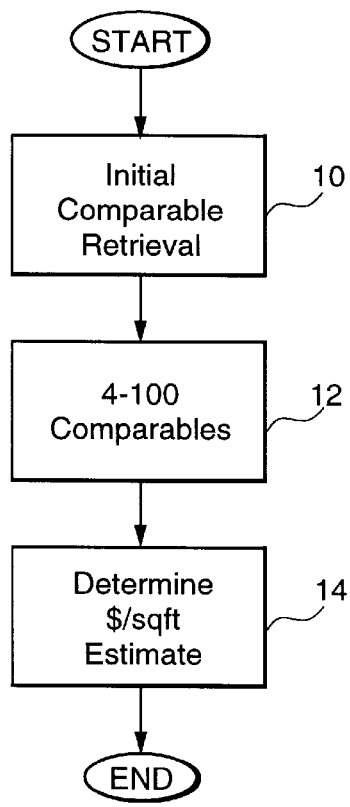
FIG. 1 is a flow chart describing the steps of determining a dollar per square foot value estimate of a subject property according to this invention.

This invention estimates the dollar per square foot value of a subject property by using case-based reasoning principles. In particular, case-based reasoning is used to automate the steps of finding recent sales comparable to the subject property, determining the most relevant units of comparison, comparing the subject property with the comparables, and estimating the dollar per square foot value of the subject property. FIG. 1 is a flow chart describing the steps of determining a dollar per square foot value estimate of a subject property according to this invention. In FIG. 1, an initial set of real estate properties that are comparable to the subject property are retrieved at 10. The initial set of comparable properties and the subject property are both characterized by a plurality of common attributes each having a respective value. The attributes include transaction characteristics such as distance of the property to the subject property, the date of sale, the living area, the number of bedrooms, and the number of bathrooms, and the lot size. The attributes of the comparable properties are then compared to the subject property in order to obtain the most closely related comparable properties. Typically, this invention will find anywhere from four to 100 comparable properties at 12. After retrieving comparable properties, an estimate of the dollar per square foot of the subject property based on the comparable properties is generated at 14.

Figure 2:
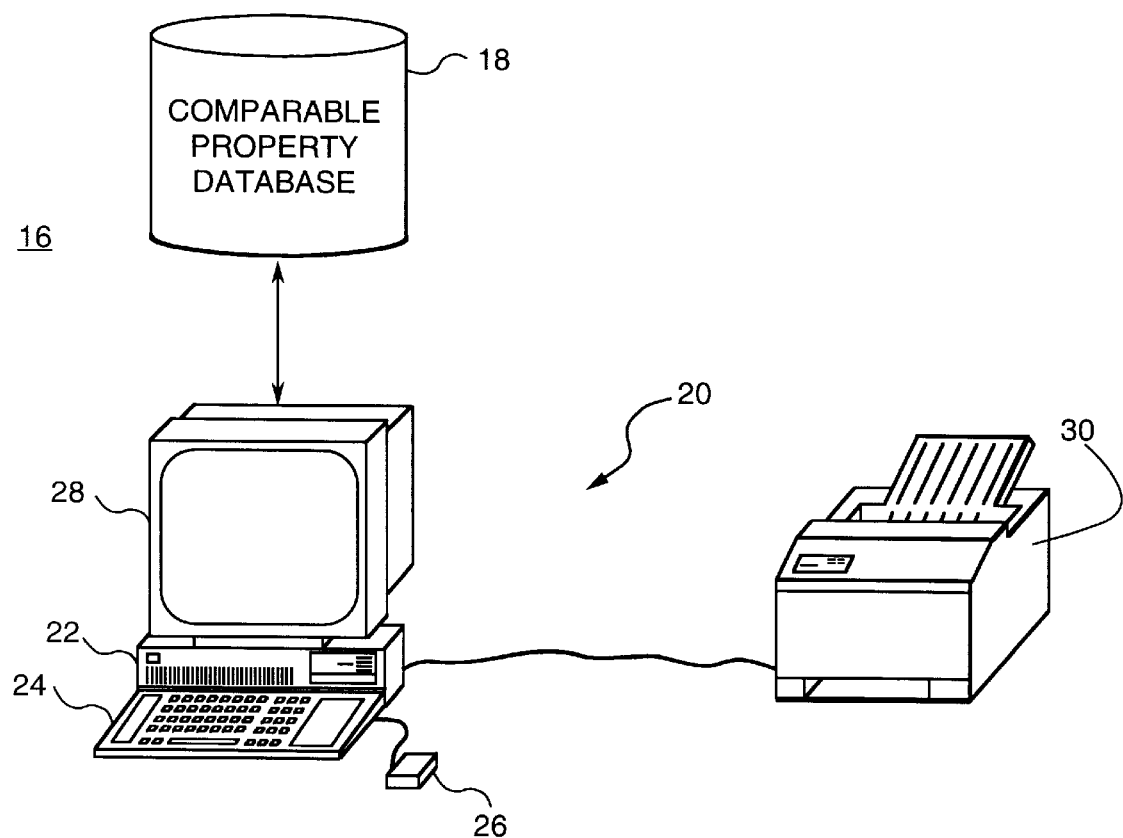
FIG. 2 is a system for determining a dollar per square foot value estimate of a subject property according to this invention.

FIG. 2 shows a schematic of a system 16 used to determine a dollar per square foot value estimate of a subject property according to this invention. The system 16 includes a comparable property database 18, and a personal computer or work station 20 having a hard drive 22, an input device such as a keyboard 24 and a mouse 26, and an output device such as a display 28 and a printer 30, connected to the database 18. The comparable property database 18 is preferably a case base having a plurality of properties that are retrieved by the computer 20 using SQL queries. In the illustrative embodiment, the case base 18 contains about 600,000 properties, with each property being characterized by about 166 attributes. Typically, the retrieval returns anywhere from four to one hundred comparable properties. The selection is performed by comparing specific attributes (i.e., distance from the subject property, date of sale, living area, the number of bedrooms, the number of bathrooms, and lot size) of the subject property with the same attributes of each comparable properties. All of the retrieved potential comparable properties have values that are within allowable deviations for the subject property. If the size of the comparable set of properties is too small (e.g., less than 10), then the allowable deviations can be adjusted so that more comparables of lesser quality can be obtained.

Figure 3:
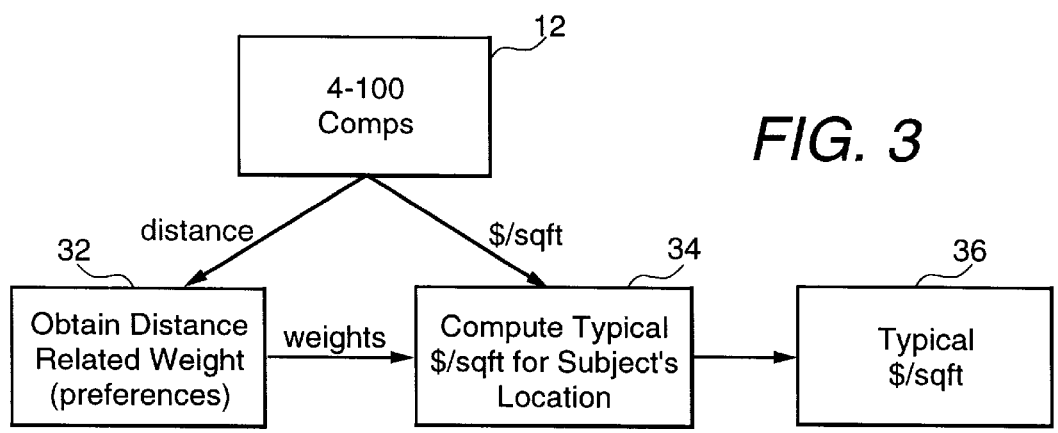
FIG. 3 is a flow chart describing the steps set forth in FIG. 1 in more detail.
Figure 4:
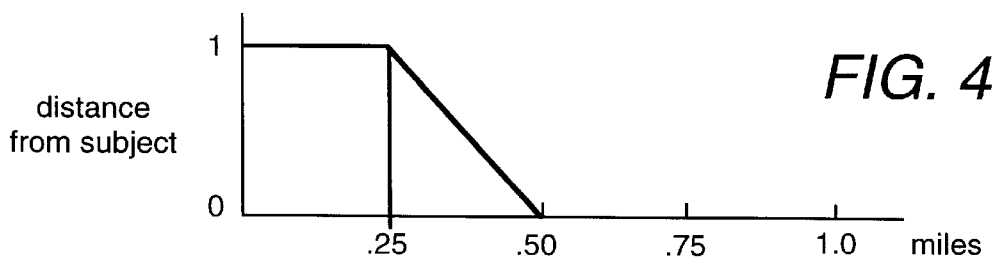
FIG. 4 is a graphical display illustrating the preference criteria used in this invention.

After the initial set of comparable properties has been retrieved, the dollar per square foot estimate is generated. The determination of the dollar per square foot estimate is shown in further detail in the flow chart of FIG. 3. In the illustrative embodiment, the dollar per square foot estimate is generated by examining the values generated for the distance of the comparable property from the subject property. In particular, the distance from the comparable property to the subject property is rated on a fuzzy preference scale that indicates desirable and tolerable deviations from an ideal match. An understanding of the preference criteria for the distance from subject property is graphically described in FIG. 4. The trapezoidal shape of the graph in FIG. 4 represents the criteria evaluation used in the present invention. In particular, the broader base of the trapezoidal shape represents the range of tolerable values and corresponds to the interval-value used in the preliminary retrieval query. The smaller base of the trapezoidal shape or the core represents the most desirable range of values and establishes the top preference for the attribute. An attribute value falling inside the most desirable region will receive a preference value of 1. As the feature value moves away from the most desirable range, its associated preference value will decrease from 1 to 0. The values in the [0,1] interval represent the partial degree of membership of the attribute values in the fuzzy sets and fuzzy relations representing the preference criteria provided in the fuzzy preference scales.

Typically, comparable properties selected in the preliminary retrieval that have attribute values falling outside the tolerable value range will not be evaluated. In the illustrative embodiment, the preference distribution for a comparable property that is located within one quarter of a mile is 1. If the comparable property is located between one quarter of a mile and a half of a mile away from the subject property, its preference value will be between zero and one. If the comparable property is located more than a half a mile away from the subject property, its preference value will be zero.

Referring again to FIG. 3, after the initial set of comparable properties has been retrieved, the comparables are evaluated to determine the distance related weight preferences at 32. The distance related weight preferences for each comparable are obtained from the graph of FIG. 4. At 34, the typical dollar per square foot value for each comparable property is determined and then outputted at 36. In particular, the typical dollar per square foot value for a subject property is determined by multiplying the weighted distance preferences for all of the comparables by each comparable's dollar per square foot value to generate a weighted dollar per square foot value. The weighted dollar per square foot value for all of the comparables are summed to generate a total weighted dollar per square foot value. The total weighted dollar per square foot value is then divided by the sum of the weighted distance values to generate an estimate dollar per square foot value of the subject property.

An example of determining the dollar per square foot value for a subject property from a set of comparable properties is shown in Table 1. In the example, ten comparable properties were retrieved. Listed in each row are the distance that the comparable property is from the subject property, the dollar per square foot value, the distance weight, and the weighted dollar per square foot value. As mentioned above, the dollar per square foot value for the subject property is determined by summing the distance weights and the weighted dollar per square foot values for all of the comparable properties and dividing the total weighted dollar per square foot values by the total distance weights.

TABLE 1

Dollar Per Square Foot Value Determination

| Property | Distance(miles) | $/sq ft | distance weight | weighted $/sq ft |
|---|---|---|---|---|
| 342-837 | 0.1 | 100 | 1 | 100 |
| 113-012 | 0.15 | 98 | 1 | 98 |
| 306-018 | 0.2 | 102 | 1 | 102 |
| 093-018 | 0.25 | 103 | 1 | 103 |
| 305-006 | 0.3 | 99 | 0.8 | 79.2 |
| 685-046 | 0.4 | 110 | 0.4 | 44 |
| 847-984 | 0.45 | 98 | 0.2 | 19.6 |
| 873-005 | 0.5 | 112 | 0 | 0 |
| 431-023 | 0.7 | 90 | 0 | 0 |
| 331-018 | 0.9 | 124 | 0 | 0 |
| Total | | | 5.4 | 545.8 |
| | | | | $/sq ft 101.0741 |

In Table 1, the total distance weight is 5.4 and the total weighted dollar per square foot value is 545.8. Dividing 545.8 by 5.4 gives a dollar per square foot value for the subject property of 101.0741.

It is therefore apparent that there has been provided in accordance with the present invention, a method for estimating the dollar per square foot value of real property that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

What is claimed is:

1. A computer-implemented method for estimating a dollar per square foot value of a subject property according to a set of comparable properties, comprising:

retrieving the set of properties comparable to the subject property from a case base, the comparable properties characterized by a plurality of common attributes each having a respective value, the plurality of common attributes comprising distance from the subject property and living area measured in dollars per square foot;

evaluating the distance attribute values from the set of comparable properties to the subject property on a fuzzy preference scale indicating desirable and tolerable deviations from an ideal match with the subject property, each evaluation generating a weighted preference having a value between 0 and 1; and aggregating the living area attribute from each of the comparable properties with the weighted preference into a dollar per square foot estimate of the subject property.

2. The computer-implemented method according to claim 1, wherein aggregating comprises multiplying the weighted preference with the dollar per square foot value for each of the comparable properties to generate a weighted dollar per square foot value, summing the weighted dollar per square foot values to generate a total weighted dollar per square foot value, dividing the total weighted dollar per square foot value by the total weighted preferences to estimate the dollar per square foot value of the subject property.

* * * * *